(12) United States Patent
Elsing et al.

(10) Patent No.: US 6,525,440 B1
(45) Date of Patent: Feb. 25, 2003

(54) THERMAL COMPENSATION SPINDLE FOR CERAMIC BALL BEARINGS

(75) Inventors: John W. Elsing, Edina, MN (US); David J. Jennings, Edina, MN (US); Martin F. Byl, Los Gatos, CA (US); Jeffery A. LeBlanc, Aptos, CA (US); Robert M. Pelstring, Santa Cruz, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/556,888

(22) Filed: Apr. 19, 2000

Related U.S. Application Data

(60) Provisional application No. 60/130,287, filed on Apr. 21, 1999.

(51) Int. Cl.$^7$ .............................. H02K 5/16; G11B 17/02
(52) U.S. Cl. .......................................... 310/90; 310/89
(58) Field of Search .................. 310/67 R, 90, 310/89; 384/498, 278; 360/99.08, 99.04, 99.07

(56) References Cited

U.S. PATENT DOCUMENTS

| | | | | |
|---|---|---|---|---|
| 4,701,651 A | * | 10/1987 | Tanaka | 310/90 |
| 4,928,029 A | * | 5/1990 | Wright | 310/89 |
| 5,112,147 A | * | 5/1992 | Imamura et al. | 384/605 |
| 5,138,209 A | * | 8/1992 | Chuta et al. | 310/67 R |
| 5,227,686 A | * | 7/1993 | Ogawa | 310/90 |
| 5,459,628 A | | 10/1995 | Brooks | |
| 5,585,682 A | | 12/1996 | Konicek et al. | |
| 5,664,889 A | | 9/1997 | Gustafson | |
| 5,714,817 A | * | 2/1998 | Norris | 310/90 |
| 5,896,242 A | | 4/1999 | Albrecht et al. | |

\* cited by examiner

*Primary Examiner*—Nestor Ramirez
*Assistant Examiner*—Karen Beth Addison

(57) ABSTRACT

This invention deals with compensating for thermal changes such that the spindle motor bearing preload remains as constant as possible throughout the disc drive operational temperature range. This is achieved by selecting a combination of materials with a composite thermal expansion that offsets the differential expansion of the steel bearing supports and the ceramic balls. The change in materials and configuration can be either that of the shaft, the hub, the support members, or any combination thereof.

11 Claims, 7 Drawing Sheets

THERMAL COMPENSATION SPINDLE FOR CERAMIC BALL BEARINGS

This patent application claims priority from U.S. Provisional Application No. 60/130,287 filed Apr. 21, 1999.

FIELD OF INVENTION

The present invention relates to disc drives, and more particularly to spindle motors in disc drives which use hybrid ceramic ball bearings.

BACKGROUND OF INVENTION

Spindle motors in disc drives typically have a set of electromagnets fixed to a shaft and a set of permanent magnets attached to a rotatable portion referred to as the housing. The electromagnets are arranged in a circle surrounding the shaft. As the electromagnets are energized in a sequential pattern travelling around the shaft, the permanent magnets are induced to follow, thus imparting a rotational force to the housing. The shaft and the housing are connected by bearings to allow for the rotation of the housing about the shaft.

An inner ring of the bearing is mounted to the shaft and an outer ring of the bearing is fixed to the housing. In this assembly, an inner raceway of the inner ring faces an outer raceway of the outer ring to form a cavity within which rolling elements, for example, balls, are located. A preload is applied to the bearings to establish proper contact between the rolling elements and the inner and outer raceways.

Bearings used in spindle motors typically use balls and raceways made from steel. Other types of bearings, which may be used in higher speed spindle motors, are hybrid ceramic bearings. These typically have raceways made of steel and balls made of ceramics. However, within a typical operational temperature increase of a disc drive, the steel raceways expand faster and to a greater extent than the ceramic balls. This differential expansion results in a decrease in the preload on the bearings, which means that the ceramic balls are no longer in proper contact with the raceways, so the performance of the spindle motor deteriorates.

However, there are advantages associated with the use of hybrid ceramic bearings in spindle motors, and some of these are briefly described below.

Compared to steel balls, ceramic balls are about forty percent less dense, and therefore have lower acoustics or natural frequencies.

Ceramic balls have a longer life due to lower heat generation between the contact surfaces. "Cold weld" spots or micro welding which may occur with steel on steel is less likely to happen with the use of dissimilar materials. Therefore the use of ceramic balls with steel raceways reduces the fretting and Hertzian stress on the raceways, hence increasing fatigue life.

Ceramics have a higher modulus of elasticity in comparison with steel, and for a given size bearing, ceramic bearings have two times the bearing stiffness of steel bearings.

It has been found that the use of ceramic balls in bearings contributes to increased grease life. This is because there is less or no metal particle generation from wear, and because of the lower heat generation when ceramic bearings are used.

Because silicone nitride is a different material from that of the raceways, the balls offer a non-galling advantage.

Another advantage of using ceramic balls is that, owing to the nature of silicon nitride, the surface finish potential of ceramic balls is better than what can be achieved with steel balls.

There is therefore a need to overcome the problem of losing the preload on hybrid ceramic bearings so that such bearings can be utilized in spindle motors for disc drives. The following description will make clear how the present invention provides an improved solution to this and other problems.

SUMMARY OF INVENTION

According to one embodiment of the invention, a spindle motor for use in a disc drive has an upper inner bearing support axially displaced from an upper outer bearing support by a first axial displacement, as well as a lower inner bearing support axially displaced from a lower outer bearing support by a second axial displacement. The spindle motor includes a shaft which is operably connected to the upper inner bearing support and to the lower inner bearing support. The spindle motor also includes a housing which is operably connected to the upper outer bearing support and to the lower outer bearing support. The shaft and the housing are configured to expand axially by different amounts for an increase in temperature such that the first axial displacement and the second axial displacements are increased over the increase in temperature.

The spindle motor includes rolling elements located between the upper outer bearing support and the upper inner bearing support. The spindle motor also includes rolling elements located between the lower outer bearing support and the lower inner bearing support. The rolling elements if ceramic, are thus configured to expand slower and to a lesser extent than the upper bearing supports and the lower bearing supports for the increase in temperature. Hence, an increase in temperature will tend to loosen the fit between the upper bearing supports and the rolling elements located therein, as well as loosen the fit between the lower bearing supports and the rolling elements located therein. The shaft and the housing are purposely configured for differential expansion which results in an increase in the first axial displacement and in the second axial displacement, thereby offsetting any differential expansion between the bearing supports and the rolling elements.

In one preferred embodiment of the present invention, the upper and lower bearing supports are made essentially of steel and the rolling ball elements are made of ceramic. The shaft is made of steel and the housing includes at least one aluminum component arranged between upper bearings and lower bearings.

DETAILED DESCRIPTION

Figure 1:
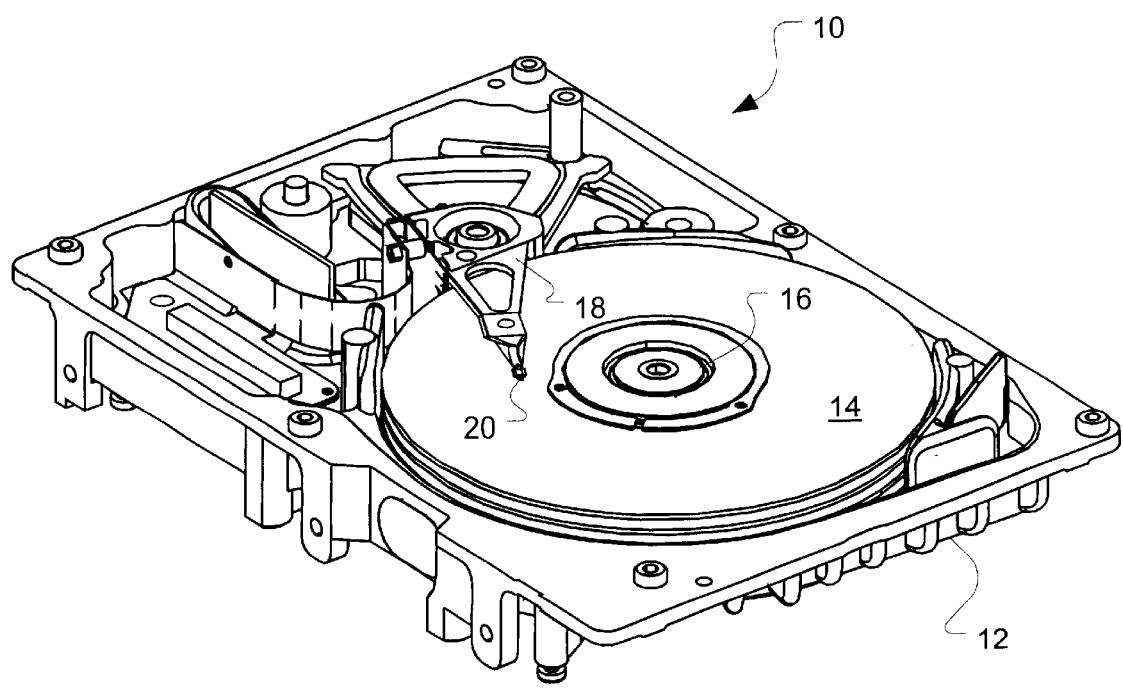
FIG. 1 is a perspective view of a typical disc drive.

FIG. 1 is a perspective view of a disc drive 10 with the cover removed to show the components mounted on a deck 12. Discs 14 are shown assembled about a spindle motor 16 which is mounted on the deck 12. Data is stored in concentric tracks on the surfaces of the discs. In operation, an actuator 18 positions a read/write head 20 near each disc surface whilst the spindle motor 16 spins the discs.

Figure 2:
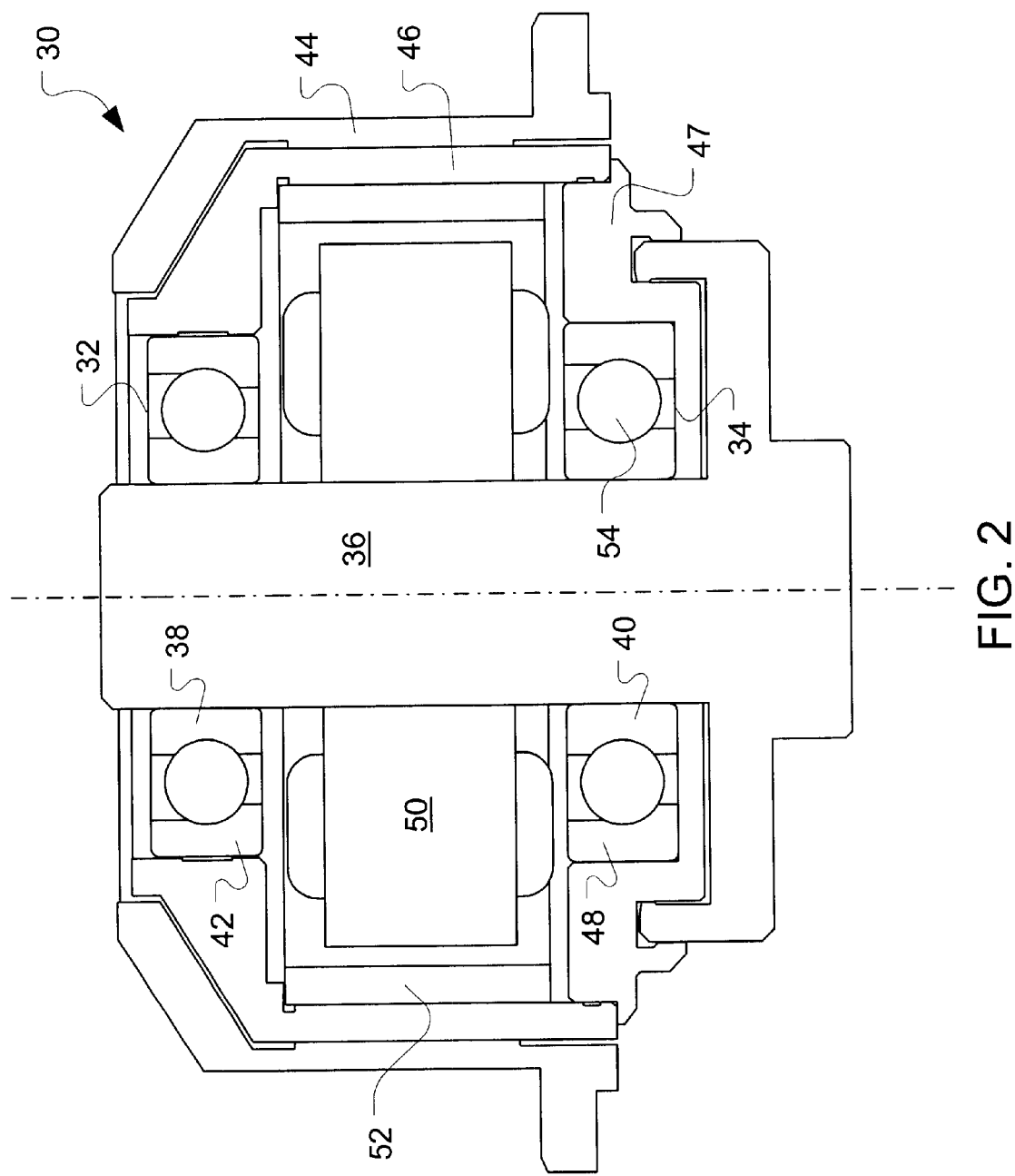
FIG. 2 shows a conventional spindle motor in cross-section.

FIG. 2 shows a cross-section of a conventional spindle motor 30. Upper bearing 32 and lower bearing 34 are mounted to a stainless steel shaft 36 at their inner rings 38 and 40. The outer ring 42 of the upper bearing 32 is mounted to a stainless steel backiron 46. The hub 44 is generally assembled to a back-iron 46 at a shrink fit tolerance. A support member 47 is mounted to the outer ring 48 of the lower bearing 34 and fitted to the backiron 46. The stator 50 is attached to the shaft 36 and corresponding permanent magnets 52 are attached to the backiron 46.

When hybrid ceramic bearings are used in conventional spindle motors with a fixed preload design, the bearings are preloaded by a fixture until an epoxy adhesive at the bearing interface is cured. Since ceramic has a lower coefficient of expansion than steel, when temperature rises, the ceramic balls 54 change very little. The preload therefore changes with temperature, tending to unload the bearings or reduce the preload when the spindle motor 30 heats up. This can cause axial and radial stiffness changes to occur. The stiffness variations can also cause resonant frequencies to vary as the temperature changes. These changes can be detrimental to the performance of the spindle motor 30 in the disc drive.

Figure 3:
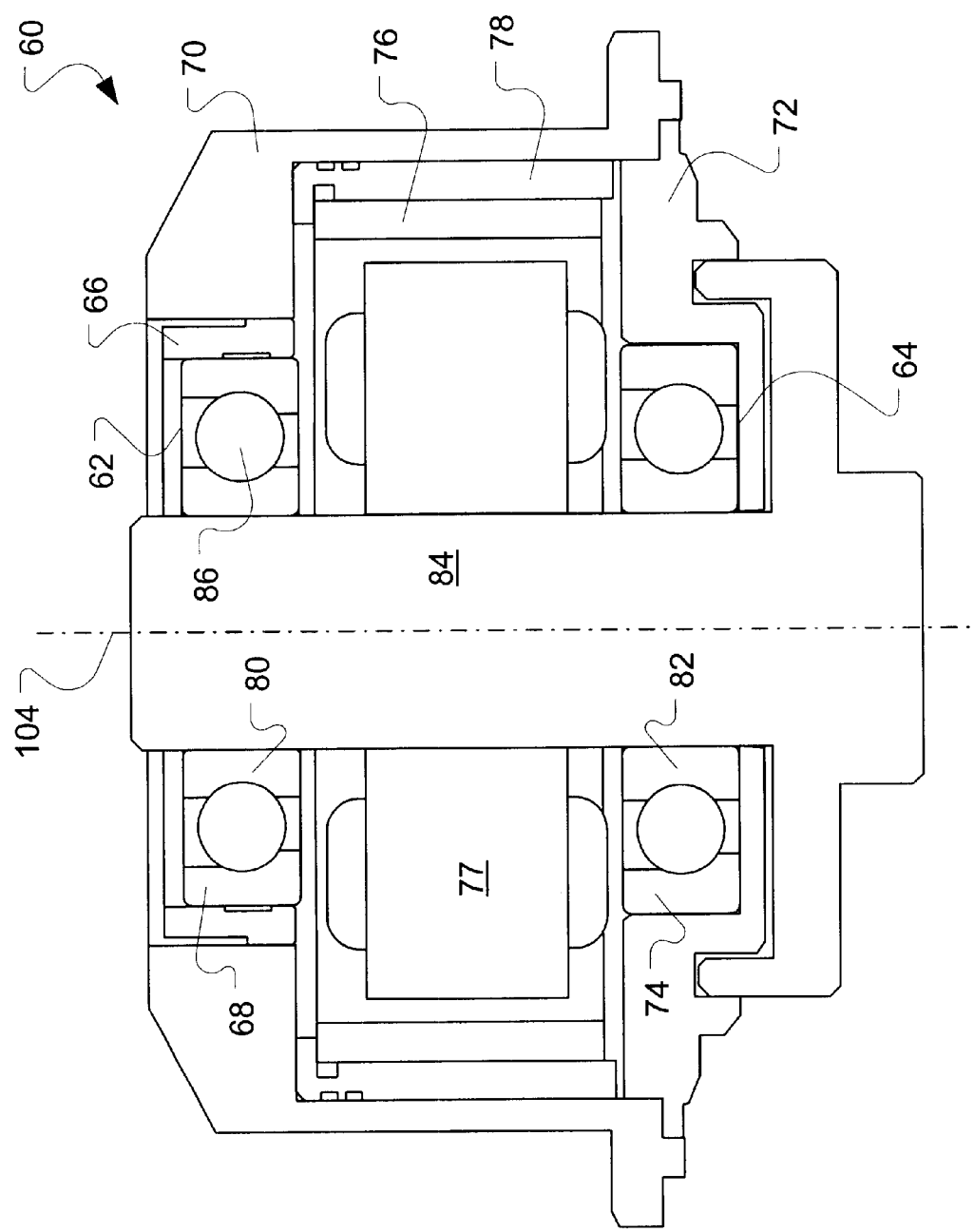
FIG. 3 is a cross-section of a preferred embodiment of the present invention.

A preferred embodiment of the present invention is described below with reference to FIG. 3. The figure shows a spindle motor 60 with upper bearing 62 and lower bearing 64. An upper member 66 of steel is mounted to a steel outer raceway 68 of the upper bearing 62. The upper member 66 is attached to a hub 70 of aluminum. A lower member 72 of steel joins the hub 70 to a steel outer raceway 74 of the lower bearing 64. The stator 77 is mounted to the shaft 84. Permanent magnets 76 are mounted to a steel back-iron 78 which is in slip fit with the hub 70. Steel inner raceways 80 and 82 are mounted to a steel shaft 84. Ceramic balls 86 are fitted between the inner raceways 80 and 82, and the outer raceways 68 and 74.

When temperature rises, the ceramic balls 86 do not expand as much as the steel raceways 68, 74, 80, and 82, and the fit between the balls and the raceways become too loose. In this embodiment, the housing is made up of at least one hub component which has a higher coefficient of expansion than the shaft. The component is preferably located between the upper and lower bearings 62 and 64. In this example where the shaft 84 is made of stainless steel, a suitable material for the hub component 70 is aluminum. Thus when the temperature rises, the aluminum hub component 70 expands more than the stainless steel shaft 84, the net effect of which is to maintain the fit between the balls 86 and the raceways 68, 74, 80, and 82. This way, the hybrid ceramic bearings are prevented from excessive unloading. In this example, the hub component 70 is in slip fit with the back-iron 78 to allow for the relative difference in expansion between the aluminum component and the steel piece.

Figure 4:
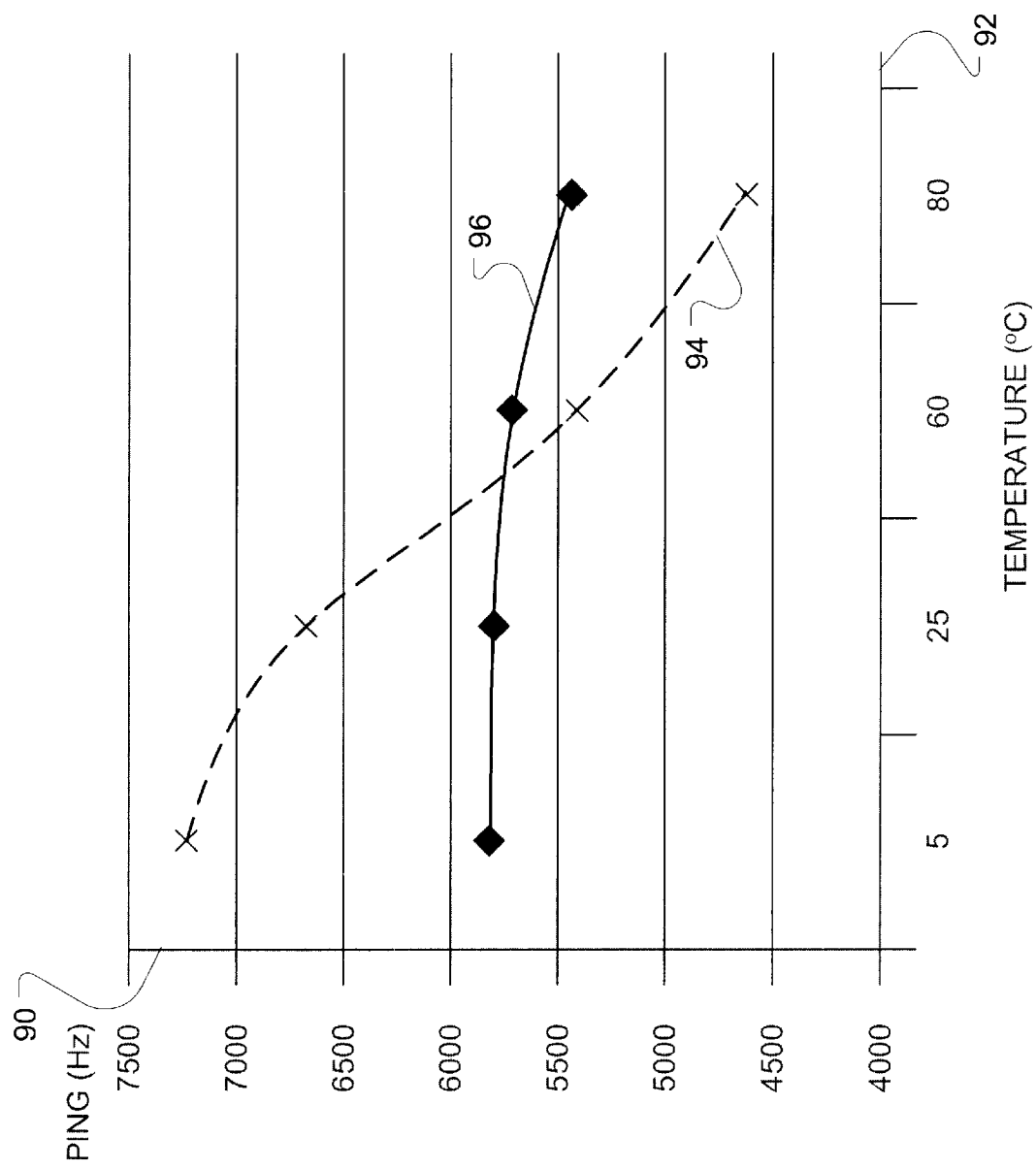
FIG. 4 is a plot of Ping data against temperature showing the improved motor characteristics provided by the present invention.

The performance of the spindle motor 60 according to this embodiment of the invention is shown in the graph of FIG. 4 in comparison with the performance of a conventional spindle motor 30 also using ceramic bearings. The graph shows a plot of Ping frequency on the y-axis 90 against temperature on the x-axis 92. The dotted line 94 shows a significant change in the Ping frequency of the conventional spindle motor 30 over a change in temperature. The solid line 96 shows a relatively constant Ping frequency over the same temperature change for the spindle motor 60 of FIG. 3. The fairly constant Ping frequency (or natural frequency) of the spindle motor 60 suggests that the preload on the bearings is not significantly varied although the temperature has risen.

Figure 5:
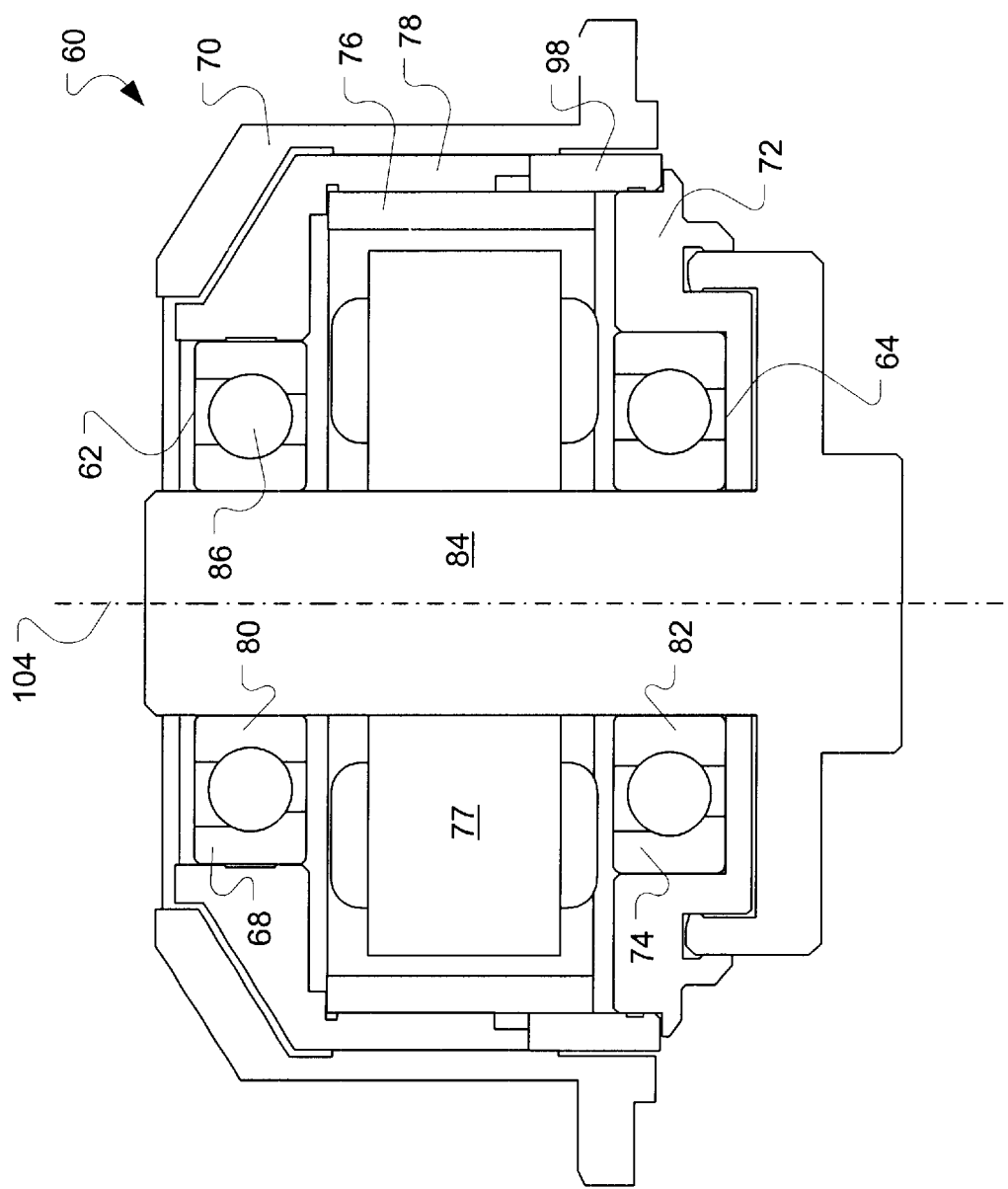
FIG. 5 illustrates an alternative embodiment of the present invention.

An alternative embodiment of the present invention is shown in FIG. 5. In this configuration, the outer raceway 68 of the upper bearing 62 is joined to a stainless steel back-iron 78 which in turn, is joined to an aluminum component 98. The aluminum component 98 is coupled to a stainless steel lower member 72. The outer raceway 74 of the lower bearing 64 is joined to the hub 70 through the lower member 72. Preferably, the aluminum component 98 may be located at the same radial distance from the shaft 84 as the outer raceways 68 and 74.

This invention deals with compensating for thermal changes such that the bearing preload remains as constant as possible throughout the disc drive operational temperature range. This is achieved by selecting a combination of materials with a composite thermal expansion that offset the differential expansion of the bearing supports and the ceramic balls such that the preload remains about constant despite the temperature variation. The material change can be in either that of the shaft, the bearing housing, the bearing housing supports, the housing, or any combination therein. This concept is further illustrated by means of FIG. 6 to FIG. 8.

Figure 6:
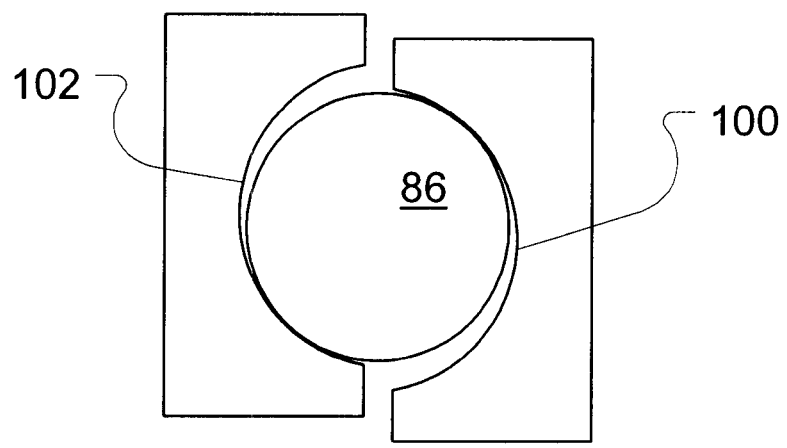
FIG. 6 is a diagrammatic representation of a bearing with a preload applied to establish proper contact between the rolling element and the bearing supports.
Figure 7:
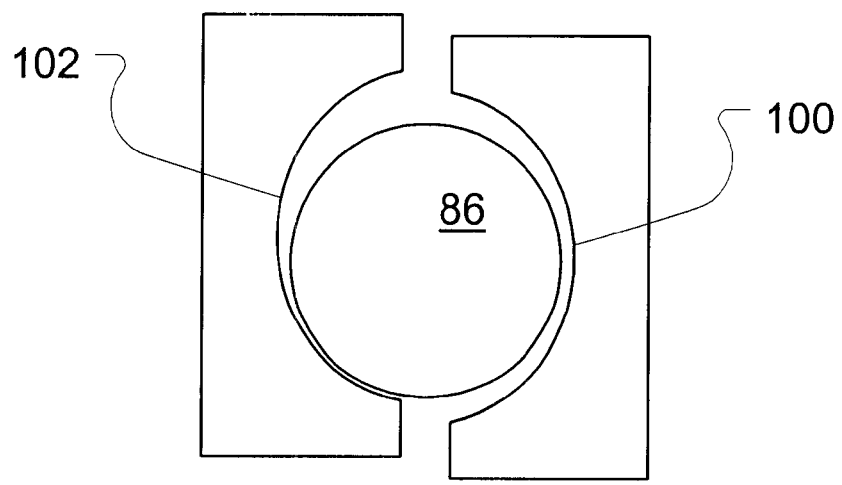
FIG. 7 is a diagrammatic representation of a bearing after an increase in temperature in a conventional spindle motor using ceramic balls.
Figure 8:
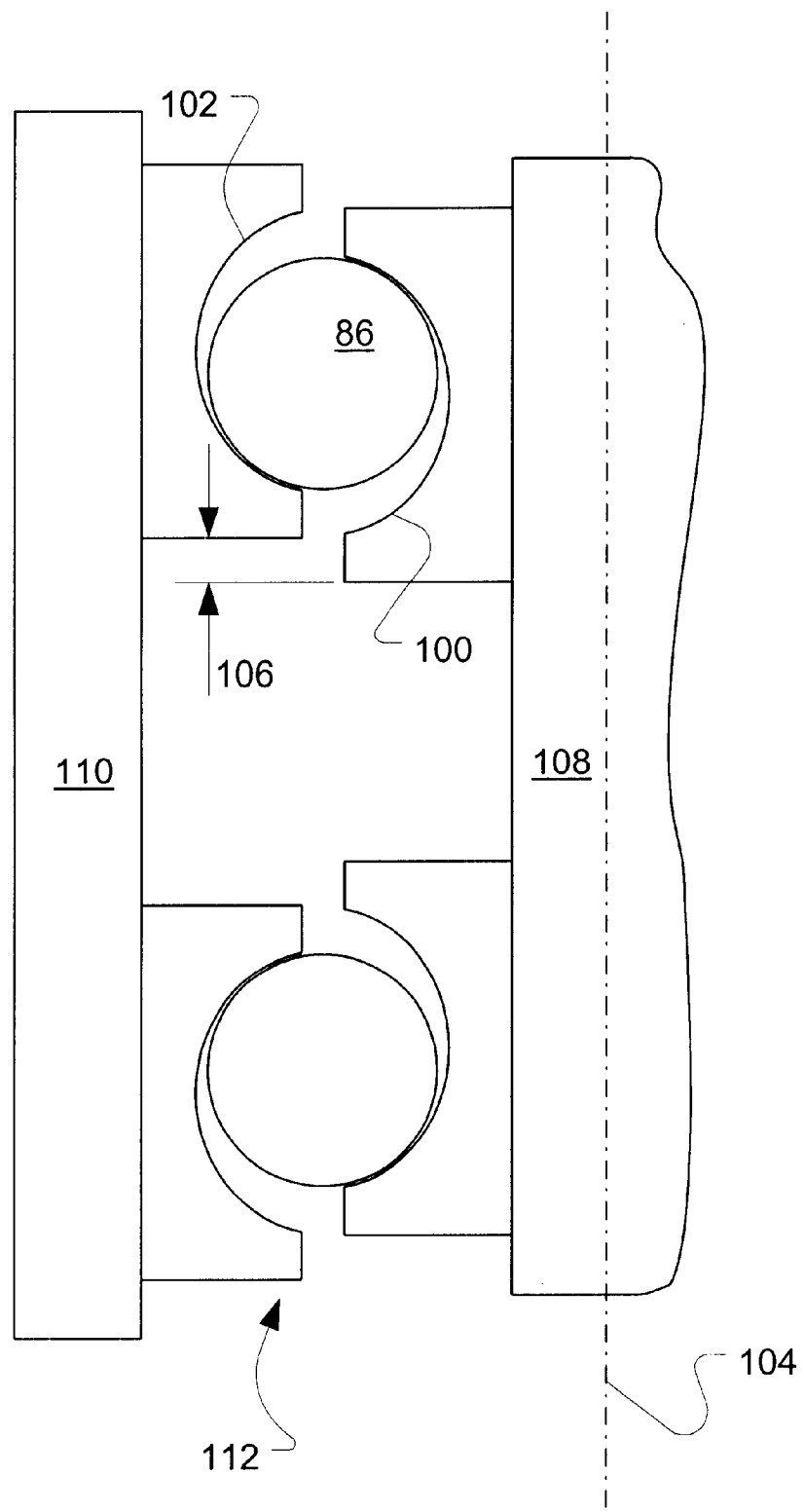
FIG. 8 is a diagrammatic representation of a bearing after an increase in temperature with an increase in the axial displacement of the shaft from the housing.

FIG. 6 shows a cross section of an arrangement of a ball 86 between an inner raceway 100 and an outer raceway 102 under preload. The ball 86 is in proper contact with both the raceways 100 and 102 for normal operation of the bearings. FIG. 7 shows the arrangement where the ball 86 is not in proper contact with both raceways 100 and 102. Such may be the situation when the raceways 100 and 102 expand more than the ball 86 when temperature rises. FIG. 8 shows the case where, although the raceways 100 and 102 have expanded more than the ball 86, the ball 86 is brought back to proper contact with the raceways 100 and 102 by displacing the raceways 100 and 102 relative to one another, in a direction generally parallel to the axis 104 of the bearings. In the examples shown in FIG. 3 and FIG. 5, the axial displacement 106 is brought about by providing a shaft 108 and a housing 110 of different coefficients of expansion duly configured. In the process of preloading, one raceway is typically set at an axial displacement 106 relative to the other. The present invention compensates for the differential expansion within the bearings 112 by increasing the axial displacement 106.

The present invention is not limited to spindle motors of the configurations discussed above, which is only given for the purpose of illustration. A person skilled in the art will be able to apply the present invention to spindle motors of various configurations, without going beyond the scope of the invention. For example, it is understood that the dimensions of the aluminum that is introduced to the housing will vary depending on the degree of preload desired and the overall motor envelope. The present invention is also not limited to the choice of aluminum although it has been found to be a preferred material when used in conjunction with a stainless steel shaft.

Alternatively, embodiments of the present invention may be described as follows:

A spindle motor 60 for use in a disc drive 10 has upper bearing supports 68 and 80, lower bearing supports 74 and 82, rolling elements 86, a shaft 108 and a housing 110. The upper bearing supports include an upper inner bearing support 80 and an upper outer bearing support 68 separated by a first axial displacement 106. Rolling elements 86 are located between the upper inner bearing support 80 and the upper outer bearing support 68. Similarly, the lower bearing supports include a lower inner bearing support 82 and a lower outer bearing support 74 separated by a second axial displacement 107. Rolling elements 86 are also located between the lower inner bearing support 82 and the lower outer bearing support 74. The shaft 108 is operably connected to the upper inner bearing support 80 and to the lower inner bearing support 82 whilst the housing 110 is operably connected to the upper outer bearing support 68 and to the lower outer bearing support 74. The shaft 108 and the housing 110 are configured to expand axially by different amounts for an increase in temperature such that the first axial displacement 106 and the second axial displacement 107 are increased over the increase in temperature.

Each one of the rolling elements 86 is configured to expand slower and to a lesser extend than the upper bearing supports 68 and 80 and the lower bearing supports 74 and 82 for an increase in temperature. Thus, the increase in temperature tends to loosen the fit between the upper bearing supports 68 and 80, and the rolling elements 86 located therein and also to loosen the fit between the lower bearing supports 74, 82, and the rolling elements 86 located therein. The shaft 108 and the housing 110 are configured such that an increase in the first axial displacement 106 and an increase in the second axial displacement 107 generally offsets the differential expansion within the bearings 62 and 64.

The shaft 108 has a first coefficient of expansion. The housing 110 includes a hub 70 which has a second coefficient of expansion which is higher than the first coefficient of expansion.

The housing 110 may include at least one component 98 with an axial location between the upper outer bearing support 68 and the lower outer bearing support 74. The component 98 is configured to have a third coefficient of expansion which is higher than the first coefficient of expansion. The component 98 may further be positioned generally at the same radial distance from the shaft 84 as the upper outer bearing support 68 or the lower outer bearing support 74.

The rolling elements 86 may be ceramic balls while the upper bearing supports 68, 80 and the lower bearing supports 74, 82 may be made essentially of steel. The shaft 84 may be made of steel. The hub 70 may be made of aluminum or it may be made of steel with at least one component 98 made of aluminum.

The present invention therefore provides an improved spindle motor which combines the advantages of using ceramic bearings with the ability to maintain the desired performance characteristics over an operational temperature range of a typical disc drive.

What is claimed is:

1. A spindle motor for use in a disc drive, the spindle motor comprising
    upper bearing supports comprising
        an upper inner bearing support; and
        an upper outer bearing support at a first axial displacement from the upper inner bearing support;
    rolling elements located between the upper inner bearing support and the upper outer bearing support;
    lower bearing supports comprising
        a lower inner bearing support; and
        a lower outer bearing support at a second axial displacement from the lower inner bearing support;
    rolling elements located between the lower inner bearing support and the lower outer bearing support;
    a shaft operably connected to the upper inner bearing support and to the lower inner bearing support; and
    a housing operably connected to the upper outer bearing support and to the lower outer bearing support, the shaft and the housing having different expansion coefficients and being configured to expand axially by different amounts with an increase in temperature inside the disc drive such that an expansion between the inner and outer bearing supports due to the increase in temperature is offset by an increase in the first and second axial displacements.

2. A spindle motor of claim 1 wherein each one of the rolling elements is configured to expand slower and to a lesser extent than the upper bearing supports and the lower bearing supports for the increase in temperature.

3. A spindle motor of claim 2 wherein the increase in temperature loosens a fit between the upper bearing supports and the rolling elements located therein and loosens a fit between the lower bearing supports and the rolling elements located therein, wherein the increase in the first axial displacement and the second axial displacement generally offsets a first differential expansion between the rolling elements and the upper bearing supports and a second differential expansion between the rolling elements and the lower bearing supports.

4. A spindle motor of claim 1 wherein the shaft has a first coefficient of expansion, and wherein the housing includes a hub with a second coefficient of expansion, the first coefficient of expansion being lower than the second coefficient of expansion.

5. A spindle motor of claim 1 wherein the shaft has with a first coefficient of expansion, and wherein the housing includes at least one component with an axial location between the upper outer bearing support and the lower outer bearing support, the component having a third coefficient of expansion which is higher than the first coefficient of expansion.

6. A spindle motor of claim 5 wherein the upper outer bearing support is positioned at a radial distance from the shaft and wherein the component is positioned generally at the same radial distance from the shaft.

7. A spindle motor of claim 5 wherein the lower outer bearing support is positioned at a radial distance from the shaft and wherein the component is positioned generally at the same radial distance from the shaft.

8. A spindle motor of claim 1 wherein each one of the rolling element is a ceramic ball and wherein the upper bearing supports and the lower bearing supports are made essentially of steel.

9. A spindle motor of claim 8 wherein the shaft is made essentially of steel.

10. A spindle motor of claim 9 wherein the housing includes a hub made essentially of aluminum.

11. A spindle motor of claim 9 wherein the rotor comprises
    a first steel component; and
    a second aluminum component.

* * * * *

UNITED STATES PATENT AND TRADEMARK OFFICE
CERTIFICATE OF CORRECTION

PATENT NO.    : 6,525,440 B1
DATED         : February 25, 2003
INVENTOR(S)   : John W. Elsing et al.

It is certified that error appears in the above-identified patent and that said Letters Patent is hereby corrected as shown below:

<u>Title page,</u>
Item [75], Inventors, replace "Jeffery A. LeBlanc" with -- Jeffry A. LeBlanc --.

Signed and Sealed this

Twenty-second Day of July, 2003

JAMES E. ROGAN
*Director of the United States Patent and Trademark Office*